Nov. 21, 1939.   D. HEYER   2,180,679
MULTIPLE BELT ADJUSTABLE SPEED DRIVE SYSTEM
Filed April 15, 1935   6 Sheets-Sheet 1

DON HEYER INVENTOR
BY John Flam
ATTORNEY

Nov. 21, 1939.  D. HEYER  2,180,679
MULTIPLE BELT ADJUSTABLE SPEED DRIVE SYSTEM
Filed April 15, 1935  6 Sheets-Sheet 3

DON HEYER INVENTOR
BY John Flam
ATTORNEY

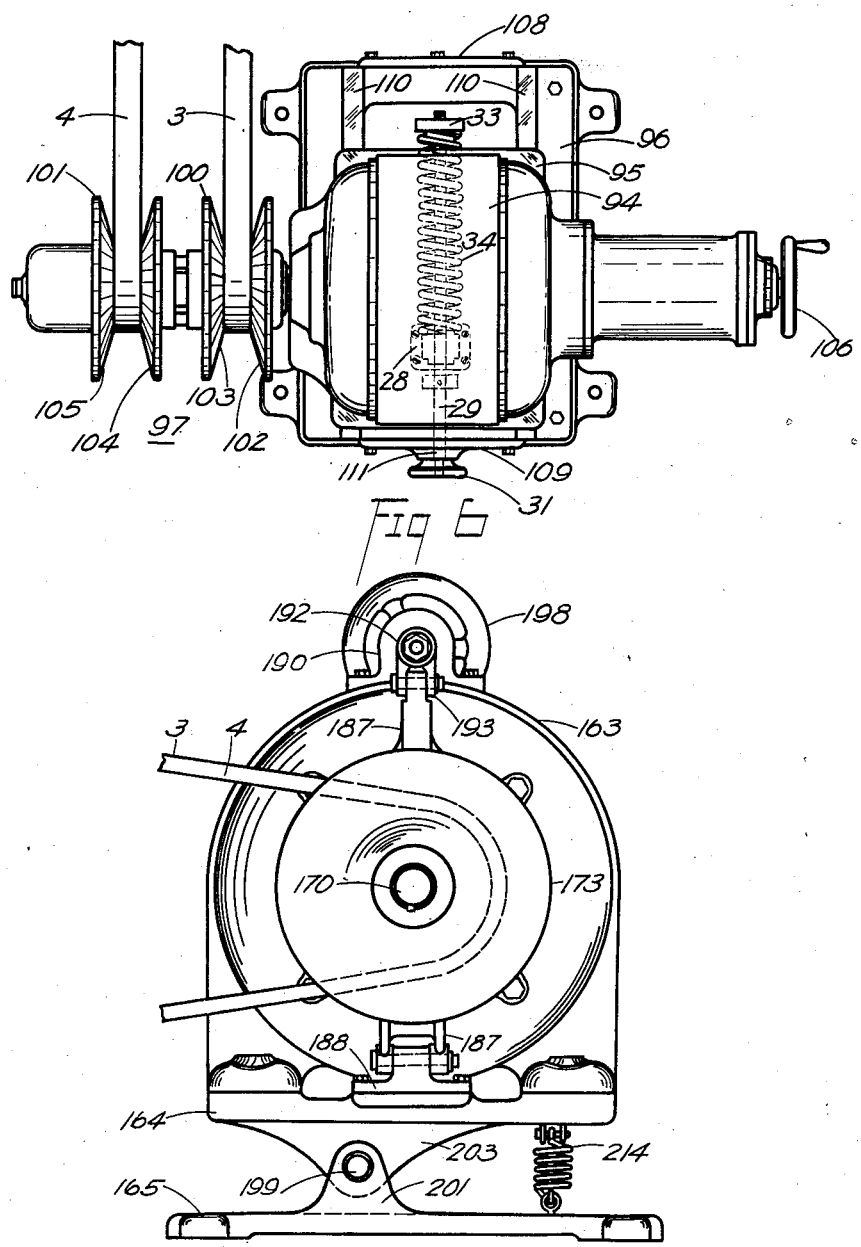

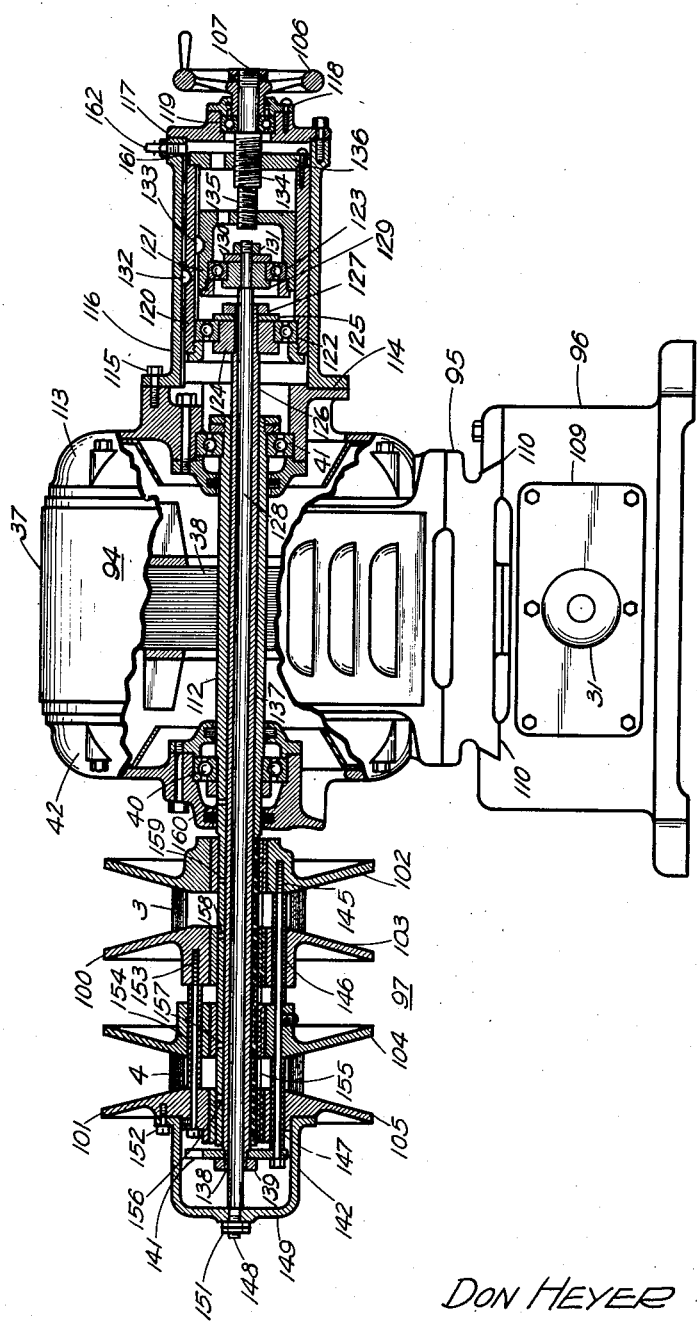

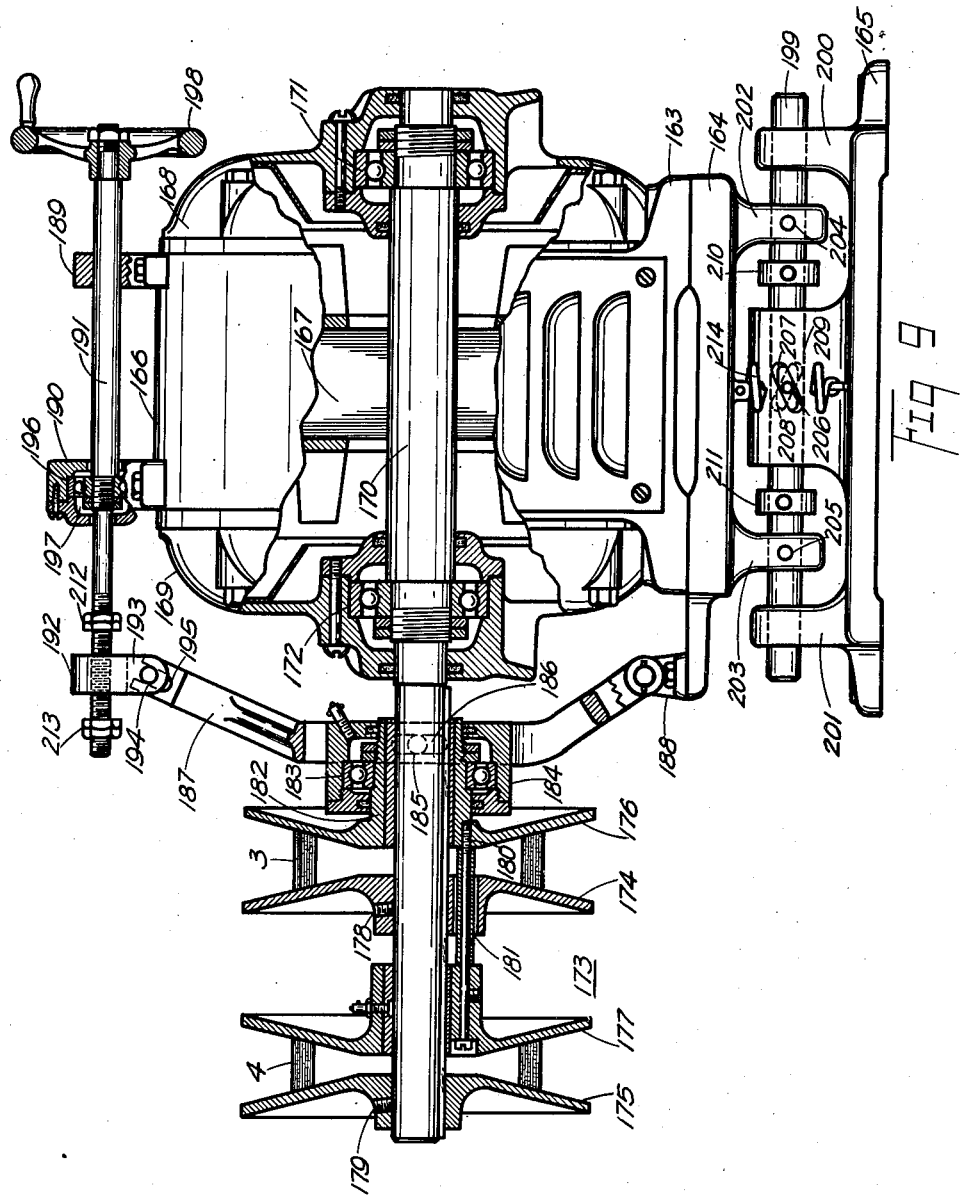

Patented Nov. 21, 1939

2,180,679

UNITED STATES PATENT OFFICE 2,180,679

MULTIPLE BELT ADJUSTABLE SPEED DRIVE SYSTEM

Don Heyer, Los Angeles, Calif., assignor to U. S. Electrical Motors, Inc., a corporation of California Application April 15, 1935, Serial No. 16,340

4 Claims. (Cl. 74—230.17)

This invention relates to an adjustable speed drive and more particularly to an adjustable speed drive incorporating an electric motor in driving relation to a driving pulley structure, a driven pulley structure in driving relation to a load driving shaft and a belt for transmitting power from the driving pulley structure to the driven pulley structure, at least one of the pulley structures having an adjustable effective pulley diameter whereby the variation of speed ratio is obtained.

Such an adjustable pulley structure may include a pair of pulley sections having opposed inclined faces forming a seat for a wedge-shaped driving belt. In order to provide means for adjusting the effective diameter of the pulley structure, the pulley sections are made relatively axially adjustable. In this way, the inclined faces can be brought closer together causing the belt to be urged radially outward to produce an increased effective diameter; or they can be separated causing the belt to contact with the inclined faces at a shorter radial distance to produce a decreased effective diameter. In the particular form of the device to be described hereinafter the adjustable speed drive has one pulley structure having an adjustable effective pulley diameter and one pulley structure which may have a fixed effective diameter. The belt or power transmitting member employed has a substantially constant effective length. This gives rise to the problem of adjusting a belt of constant length to pulleys of relatively variable effective diameter. When only one adjustable diameter pulley structure is employed the belt may be maintained in active driving relation to the pulley structures by adjusting the center distance between the axes of the two pulley structures simultaneously with the adjustment of the adjustable diameter pulley structure. Thus in constructions, employing one adjustable diameter pulley structure and in which the center distance is variable, it is necessary to provide means whereby the center distance and the diameter of the adjustable pulley structure may be adjusted at the relative rates required by the pulley diameters and the belt length. There is, however, no constant relation between the rate of change of the center distance and the rate of change of the diameter of the adjustable pulley structure; as the diameter of the adjustable pulley structure is not a simple function of the center distance; but is also a function of the belt length and of the diameter of the other pulley structure. In the construction to be described hereinafter this problem is solved by providing positive means for adjusting the effective diameter of the adjustable pulley structure and by providing yielding means for adjusting the center distance between the axes of the two pulley structures in accordance with the adjustment of the adjustable diameter pulley structure.

Where relatively high speed electric motors are employed for driving the adjustable pulley structure the maximum variation in speed ratio may be obtained by the use of relatively thin belts which are not of excessive width and which may be bent over relatively small pulley diameters. Belts of this type however do not have an exceedingly large power capacity. Thus in order to produce an adjustable speed drive having an increased power capacity it is necessary to employ several belts in parallel and dividing the load between them. It is accordingly an object of this invention to provide an adjustable speed drive having a positively adjusted pulley diameter and a variable center distance, in which means are provided for employing multiple belt pulleys.

In the form of the device which is described hereinafter, the multiple belt adjustable diameter pulley is formed by a plurality of adjustable diameter pulley structures supported on a common shaft, each of the adjustable diameter pulley structures having a pair of pulley sections with opposed inclined faces. When the diameter of the adjustable pulley structure is changed, the belt is moved axially with respect to each of the opposite facing pulley sections. Thus if the belt is to be maintained in alignment, it is necessary to move each of the opposing pulley sections in opposite axial directions by equal amounts; when the diameter of the pulley structure is adjusted.

It is accordingly still another object of this invention to provide a multiple belt adjustable speed drive, in which the center distance between the axes of the driving and driven pulley structures is variable and in which means are provided for positively adjusting the relative axial position of the pulley sections of each of the adjustable pulley structures to maintain the belts in alignment.

In one form of the multiple belt adjustable speed drive, which is described hereinafter, one pulley section of each of the adjustable diameter pulley structures of the multiple belt pulley is fixed with respect to the motor shaft, and means are provided for adjusting the axial position of the other of the pulley sections with respect to the fixed pulley section. The condition that the belt be maintained in alignment requires that both of the pulley sections of each of the adjustable pulleys be moved in opposite axial directions with respect to the belt. This may be accomplished by moving the shaft and each of the pulley sections secured thereto in one axial direction and the axially adjusted pulley sections in the opposite axial direction. This adjustment of the center distance and of the axial position of the pulley sections secured to the motor shaft may be accomplished by means of an adjustable support, which provides means for moving the driving motor and the pulley structures driven thereby in the required axial direction simultaneously with the adjustment of the center distance between the driving and driven pulleys.

It is accordingly still another object of this invention to provide a multiple belt adjustable speed drive, in which positive means are provided for adjusing the effective pulley diameter, and in which means are provided for adjustably mounting one of the pulley structures for movement in a direction to vary the center distance between the driving and driven pulleys as well as in a direction to maintain the belts in substantial alignment.

It is still another object of this invention to provide an electrically driven adjustable speed drive having a positively adjustable pulley diameter and a variable center distance between the driving and driven pulley structures, in which the driving pulley structure may be adequately supported by the shaft of the driving motor.

It is still another object of this invention to provide an electrically driven multiple belt adjustable speed drive, in which the adjustable diameter multiple belt pulley may be supported on the motor shaft with a minimum change of existing motor construction.

This invention possesses many other advantages and has other objects which may be made more easily apparent from a consideration of several embodiments of the invention. For this purpose there are shown several forms in drawings accompanying and forming a part of the present specification. These forms will now be described in detail which illustrate the general principles of the invention; but it is to be understood that this detailed description is not to be taken in a limiting sense; since the scope of the invention is best defined by the appended claims.

Referring to the drawings:

Figure 1 is a plan view of an adjustable speed drive embodying the invention. This view illustrates in particular the means provided for adjusting the center distance between the driving and driven pulley structures, the means whereby the multiple belt adjustable diameter pulley structure is supported by the motor shaft and the means provided for maintaining the driving belts in substantial alignment.

Figure 6 is a plan view of the driving motor, and adjustable pulley structure of another form of multiple belt adjustable speed drive embodying the invention.

Figure 7 is a detailed view of the adjustable pulley structure of Figure 6. This view is partly in section taken along the axis of the motor shaft.

Figure 8 is a side elevation of the driving motor and adjustable pulley structure of another form of multiple belt adjustable speed drive embodying the invention.

Figure 9 is a side elevation of the driving motor structure of Figure 8, taken from the right hand side of Figure 8, and illustrates the means provided for adjusting the effective diameter of the multiple belt pulley.

Figure 1:
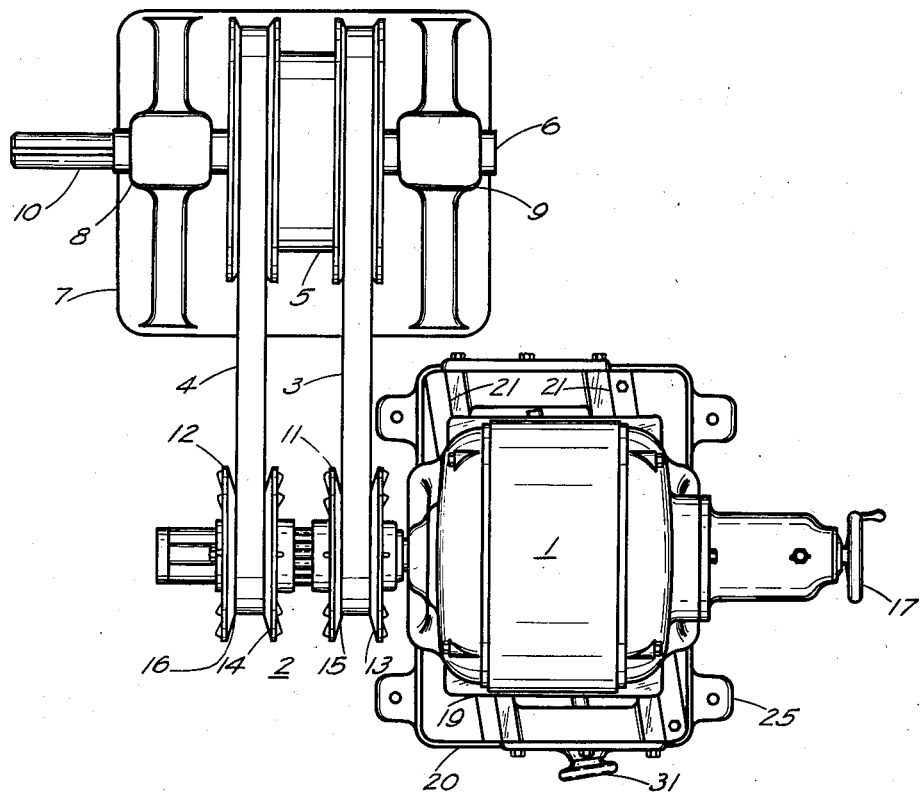

Referring to Figure 1; the adjustable speed drive is formed by the driving electric motor 1, which is in driving relation to the multiple belt adjustable diameter pulley 2, mounted on the motor shaft and which by means of the belts 3 and 4 drives the multiple belt pulley 5, mounted on the load driving shaft 6. The load driving shaft 6 may be directly supported on the frame of the driven machine; or it may be rotatably supported independent of the driven machine. In the present instance, the load driving shaft 6 is provided with the load driving extension 10 and is supported on the frame 7 by means of the bearings 8 and 9.

The driving pulley 2 is formed by the adjustable diameter pulley structures 11 and 12, pulley structure 11 being in driving relation to belt 3 and pulley structure 12 in driving relation to belt 4. The adjustable pulley structures 11 and 12 respectively have the pulley sections 13 and 14, which are secured to the motor shaft, and the pulley sections 15 and 16, which are axially movable with respect to the motor shaft.

The pair of pulley sections forming each of the adjustable diameter pulley structures have opposed inclined belt engaging faces, which form by relative axial adjustment variable effective pulley diameters. For instance, if it is desired to increase the effective diameter of the adjustable pulley structure 11, the pulley sections 13 and 15 are moved toward each other. This movement of the pulley sections toward each other forces the driving belt radially outward to define a larger effective diameter. Conversely, a separating movement of the pulley sections allows the belt to move radially inward to define a smaller effective diameter. The pulley sections 15 and 16 are axially adjusted by means of the handwheel 17, which is rotatably supported coaxial with the motor shaft. The means whereby the rotation of the handwheel 17 produces the axial adjustment of the pulley sections will be described in detail in connection with Figure 4.

To provide means for varying the center distance between the driving and driven pulley structures, the motor 1 is mounted on the sliding motor base 19, which is in turn supported on the subbase 20. When the pulley sections 15 and 16 are axially adjusted by means of the handwheel 17, to decrease the effective diameter of the driving pulley structures, the pulley sections 13 and 14 must also be withdrawn from the belt in the opposite axial direction and the center distance between the driving and driven pulleys must be increased to the value required by the decreased pulley diameter. The pulley sections 13 and 14 are fixed to the motor shaft. Thus in order to obtain the required motion of the pulley sections 13 and 14, the motor 1 together with the pulley sections 13 and 14 must be moved toward the right, as viewed in Figure 1, simultaneously with the increase in the center distance between the driving and driven pulleys. To provide the required axial adjustment of the motor and the pulley sections associated therewith, the sub-base 20, which supports the sliding base 19, is provided with the angular guide 21, which engages the sliding motor base and moves it in an axial direction in response to the adjustment of the center distance between the driving and driven pulleys.

Figure 2:
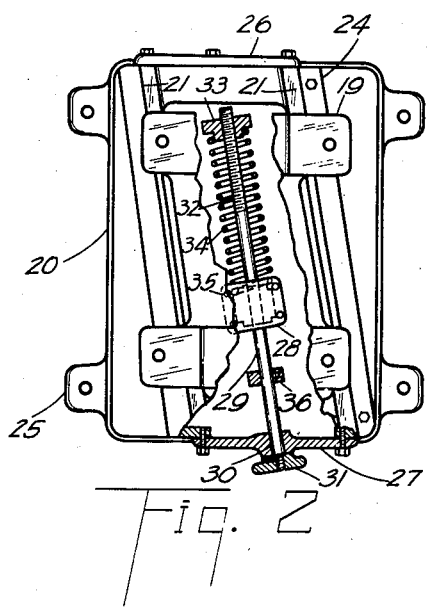
Figure 2 is a plan view of the motor supporting structure of Figure 1 and illustrates in particular the means provided for adjustably supporting the motor and driving pulley to vary the center distance between the driving and driven pulleys and to maintain the belt in alignment.
Figure 3:
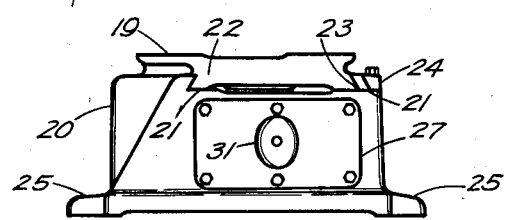
Figure 3 is a side elevation of the motor supporting structure of Figure 1, taken from the front of Figure 1, and illustrates the means provided for guiding the movement of the supported motor and driving pulley structure.

The motor supporting structure of Figure 1 is illustrated in detail by Figures 2 and 3. Referring to Figure 3; the sliding motor base is provided with the tongue members 22 and 23, which engage the angular guide 21 formed on the sub-base, the sub-base being provided with the adjustable member 24 for adjusting the sliding clearance between the tongues 22 and 23 and the angular guide. The sub-base 20 is in turn provided with appropriate feet 25 whereby it may be secured to the supporting foundation. The angular relation of the guide 21 to the motor axis is determined by the diameters of the driving and driven pulleys, the center distance and the elevation of the driven pulley with respect to the driving pulley. As the center distance and the diameter of the driving pulley are variable, the required angle for the guide is also variable. However, an intermediate value may be chosen for the guide angle such that the required adjustment may be substantially provided throughout the range of adjustment of the variable speed drive.

The means whereby the center distance between the driving and driven pulleys is adjusted in accordance with the adjustment of the adjustable diameter pulley structures is illustrated by Figure 2. Referring to Figure 2; the sub-base 20 is provided with the removable cover plates 26 and 27 which together with the sub-base form a housing for enclosing the means for adjusting the position of the sliding motor base 19. The sliding base 19 has removably secured thereto the pedestal 28, which is provided with a bushing through which the rod 29 projects. Rod 29 projects through the bushing 30 formed in the removable cover plate 27 and has threadedly secured thereto the round disc 31, which abuts against the bushing 30. The rod 29 also is provided with the threaded end 32, which threadedly engages the bushing 33. The bushing 33 has supported thereon the helical compression spring 34, one end of which abuts against a shoulder formed on the bushing and the other end of which urges the pedestal 28 and the sliding base 19 secured thereto in a center distance increasing direction. The rod 29 also has removably secured thereto the collar 36 for limiting the movement of the pedestal 28 and the associated sliding base 19.

The compression spring 34 and the associated structure provide means for adjusting the center distance between the driving and driven pulleys in accordance with the adjustment of the adjustable diameter pulley structures. For if the diameter of the adjustable pulley structures 11 and 12 is decreased, the spring 34 urges the sliding base 19 and the supported motor and adjustable pulley structures in a center distance increasing direction until the belts are once more adjusted to the decreased pulley diameter. Conversely, when the diameter of the adjustable pulley structures is increased the spring 34 allows the sliding base to move the driving motor and the supported pulley structures to provide a decreased center distance between the driving and driven pulleys.

The removable cover plates 26 and 27 and the removable pedestal 28 provides means whereby the compression spring 34 may be easily inserted into position. For if it is desired the rod 29 may be assembled as a unit together with the bushing 33, the helical spring 34, the removable pedestal 28 and the collar 36 and may be entered into the assembly of the motor supporting structure through the aperture provided by the removable cover plate 27. The removable pedestal may then be secured to sliding base 19 by means of the screws 35, after which, the removable cover plate 27 and round disc 31 may be inserted into position. The disc 31 and the threaded bushing 33 provide means whereby the force exerted by the spring 34 on the sliding base may be adjusted, after the driving motor and adjustable pulley structure are assembled. For it is obvious from the construction that a rotation of the disc 31 and of the associated rod 29 causes the threaded bushing 33 to be advanced along the rod 29 to increase the compression force exerted by the spring 34 on the pedestal 28.

Figure 4:
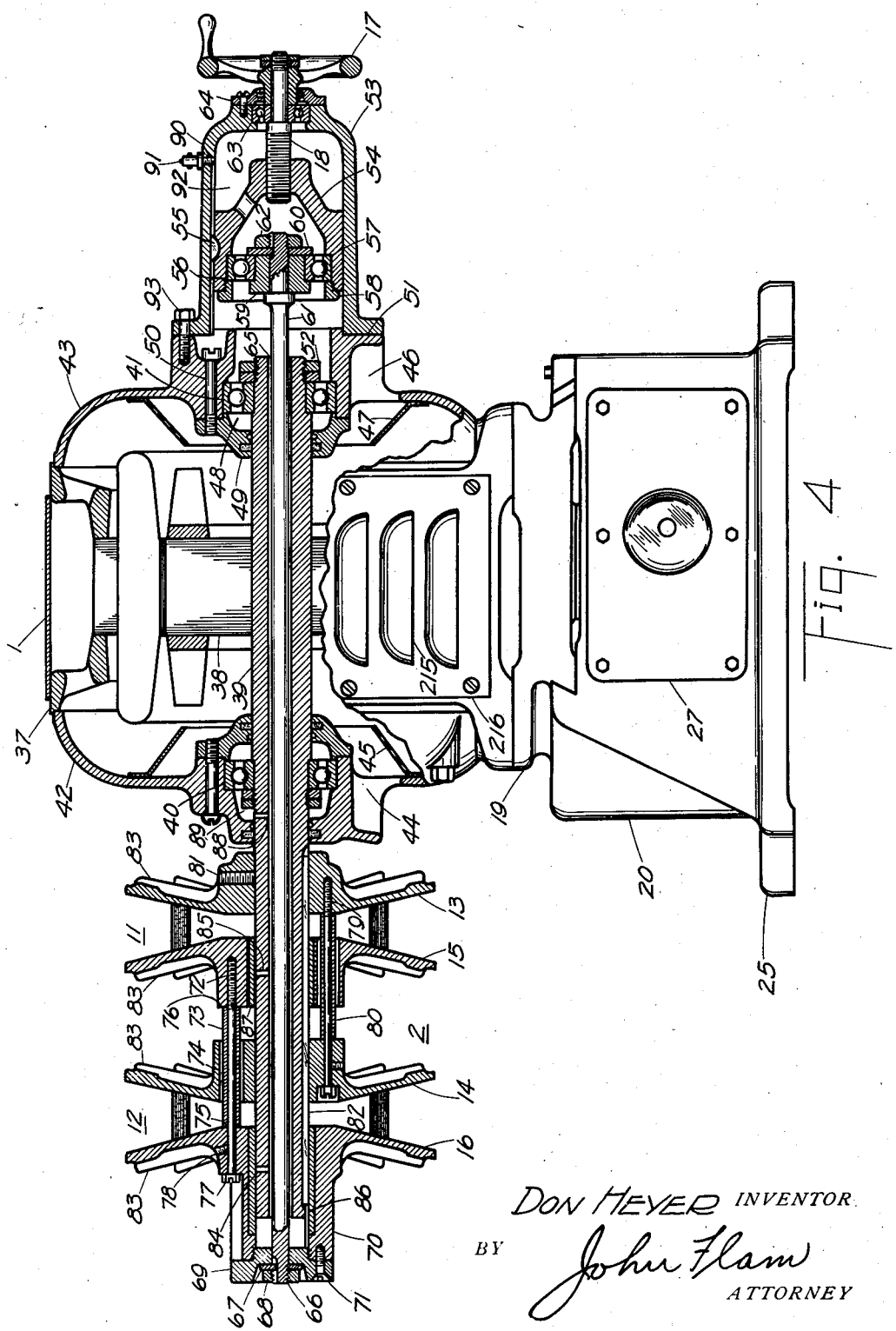
Figure 4 is a detailed view of the driving electric motor and multiple belt adjustable pulley structure of the adjustable speed drive of Figure 1.

The construction of the driving motor and of the adjustable pulley structures is illustrated in detail by Figure 4. Referring to Figure 4; the driving motor 1 is provided with the frame 37, the rotor 38 and the tubular motor shaft 39. The motor shaft 39 is rotatably supported by the bearings 40 and 41, which are in turn respectively supported on the end brackets 42 and 43. The end bracket 42 may be of the type employed in standard motor construction and may be suitably provided with the downwardly directed air intake passage 44 and the air deflector 45, for the motor ventilation. The end bracket 43 is of special construction. However, it may be machined to fit the standard stator dimension so that the positions of the end brackets 42 and 43 may be interchanged with respect to the stator. The end bracket 43 may also be provided with a downwardly directed air intake passage 46 and the air deflector 47 for the motor ventilation. The ventilating air may be discharged from the motor structure through the downwardly directed air discharge passages 215, formed in the removable cover band 216.

The bearing 41 is supported in the bearing housing 48 formed in the end bracket 43 and is suitably held against axial movement by the bearing cap 49. The bearing cap 49 may be suitably secured to the end bracket 43 by means of the screws 50, which pass through the end bracket 43 and which are threaded into the bearing cap, the heads of the screws being countersunk below the flanged surface 51, formed on the member 43. The bearing 41 is suitably secured to the motor shaft by means of the lock nut 52.

The flanged surface 51, formed on the member 43, has secured thereto the control housing 53, which in turn supports the axially adjustable bearing housing 54. The axial movement of the bearing housing 54 is guided by the key 55, which permits the axial movement of the bearing housing but prevents the rotation thereof. The bearing housing 54 has secured therein the bearing 56, one race of which is held to the bearing housing between the shoulder 57, formed on the bearing housing, and the bearing cap 58. The inner race of the bearing is supported on the bushing member 59 and is held against axial movement by the lock washer 60, the bushing 59 and the lock washer 60 being in turn secured to the rod 61 by the lock nut 62. It is obvious from the construction that an axial movement of the bearing housing 54 results in a corresponding axial movement of the bearing 56 and the rod 61. The bearing housing 54 is axially adjusted by means of the lead screw 18, which threadedly engages the bearing housing and which is rotatably supported by the bearing 63. The bearing 63 is suitably supported by the control housing 53 and is held against axial movement by the bearing cap 64.

The rod 61 projects through the aperture 65, formed in the motor shaft, to the opposite end of the motor shaft and is provided with the threaded end 66, to which is secured by means of the lock washer 67 and the nut 68 the threaded cap 69. The threaded cap 69 engages an internal thread formed in the hub 70 of the pulley section 16, and may be effectively locked to the hub 70 by means of the screw 71, which passes through the cap and which is threaded into the hub 70.

The position of the axially adjustable pulley section 16 is interlocked with that of the adjustable pulley section 15 by means of the threaded rods 72 and the sleeves 73. The sleeves 73 project through the apertures 74, formed in the axially fixed pulley section 14 and abut against shoulders 75 and 76, formed respectively on the axially adjustable pulley sections 16 and 15. The pulley sections 15 and 16 maybe securely held together by providing a sufficient number of the sleeves 73 and the threaded rods 72 spaced at equal angular positions. Each of the rods 72 is threaded into the pulley section 15 and is provided with a flat head 77 which holds the pulley section 16 against the end of the corresponding sleeve 73. A set screw 78 may be provided for each of the threaded rods to prevent the rotation of the threaded rods after they are in position. The axially fixed pulley sections 13 and 14 may also be interlocked by means of the threaded rods 79 and the sleeves 80 which hold the pulley sections against relatively axial movement. The pulley sections may be suitably secured to the motor shaft by means of the set screw 81 which passes through the hub of the pulley section 13 and which engages the surface of the motor shaft 39.

It is obvious from the construction that an axial movement of the rod 61, produced by the rotation of the handwheel 17 and lead screw 18, results in a corresponding axial movement of the pulley sections 15 and 16. It is thus obvious that the effective diameter of the adjustable pulley 2, may be positively adjusted in either direction by means of the construction provided.

The pulley sections may be suitably splined to the motor shaft by means of the key 82, which permits the axial movement of the pulley sections, but which prevents the relative rotation thereof. To provide means for cooling the driving belt each of the pulley sections may have the fan blades 83 formed on the reverse side thereof. The fan blades cause a constant stream of air to be blown over the reverse face of the pulley section, thereby effectively dissipating the heat generated by the internal and surface friction of the belt.

The aperture 65 formed in the motor shaft provides effective means for lubricating the supporting surfaces of the axially adjustable pulley sections. The lubricating apertures 84 and 85 may be provided for conducting lubricant from the bore 65 formed in the motor shaft to the pulley supporting surfaces of the pulley sections 16 and 15. To further reduce the friction between the pulley sections and their supporting surfaces the pulley sections 16 and 15 may be respectively provided with the bearing bushings 86 and 87 formed of lubricant retaining bearing material.

The lubricant may also be conducted to the bearing 40 through the aperture 65 of the motor shaft by providing the aperture 88, which connects the bearing housing 89 of the bearing 40 with the passage 65.

In the present instance common means are provided for supplying lubricant to the pulley structures and to the bearings rotatably supporting the motor shaft, the rod 61 and the lead screw 18. For this purpose the control housing has formed therein the lubricant conducting passage 90 which conducts lubricant to the lubricant retaining chamber 92 formed by the control housing. The lubricant conducting passage 90 may be suitably threaded to engage the lubricating fixture 91 of the type commonly employed with pressure lubricator. It is obvious from the construction that the lubricant injected through the passage 90, is conducted to bearings 41, 56 and 63, and by means of the aperture 65 and the lubricating passages 88, 84 and 85 to the bearing 40 and to the supporting surfaces of the pulley sections 15 and 16.

The construction provided is of particular utility as it provides means whereby the pulley structure may be quickly assembled or disassembled. The removal of the lock nut 68 and of the set screw 81 permits the entire adjustable pulley structure to be withdrawn from the motor shaft; or the removal of the lock nut 68 and of the bolts 93, which hold the control housing 53 to the end bracket 43, permits the removal of the control housing and of the entire adjusting mechanism of the rod 61.

Figure 5:
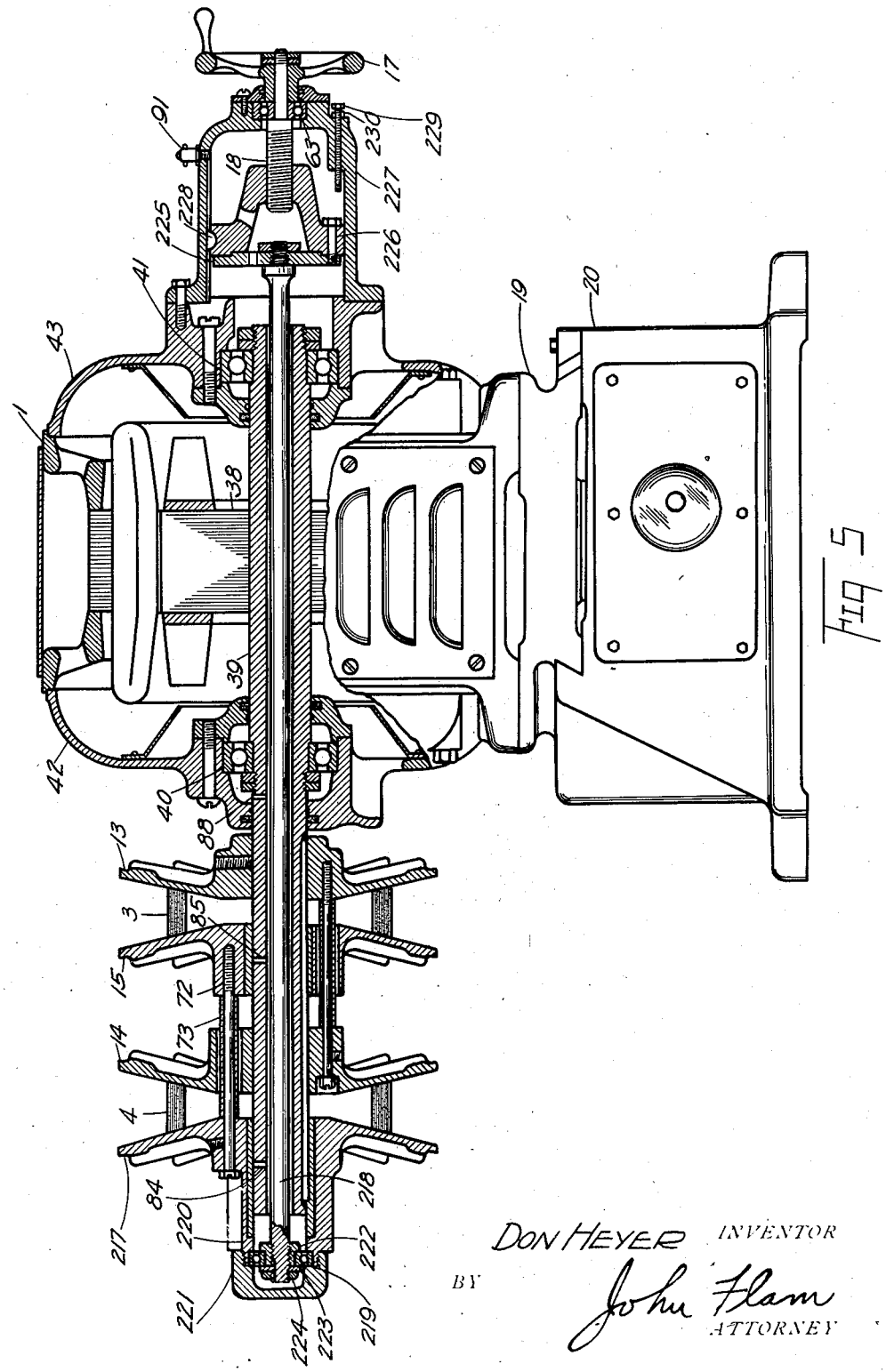
Figure 5 is a detailed view, similar to Figure 4, of another form of the driving motor and pulley structure employed in the adjustable speed drive of Figure 1.

Figure 5 illustrates another form of the driving electric motor and pulley structure, which may be employed in the adjustable speed drive of Fig. 1. The form illustrated by Fig. 5 is similar to that of Fig. 4, except for the means provided for adjusting the position of the axially adjustable pulley sections. In common with the construction of Fig. 4, the construction of Fig. 5 includes the driving electric motor 1, mounted on the sliding motor base 19, which is in turn supported on the sub-base 20. The motor 1 includes the rotor 38 and tubular motor shaft 39, which are rotatably supported by means of the bearings 40 and 41 on the end brackets 42 and 43.

In this form the pulley section 16, of Figure 4, is replaced by the pulley section 217. The remaining pulley sections 13, 14, and 15 are indentical with those of Figure 4. The pulley section 217 is axially fixed to the pulley section 15 by means of the rods 72 and sleeves 73, previously described. The pulley sections 217 and 15 are axially adjusted by means of the rod 218 and the bearing 219. For this purpose one race of the bearing is secured to the hub 220 of the pulley section 217 by means of the bearing cap 221, and the other race of the bearing is secured to the rod 218 by means of the bushing 222, the lock washer 223 and the lock nut 224.

The rod 218 projects through the tubular motor shaft to the opposite side of the motor, and has removably secured thereto the plate 225, which in turn is removably secured to the axially adjustable member 226. The axially adjustable member 226 is slideably supported by the control housing 227 and is held against rotation by the key 228. The member 226 threadedly engages the lead screw 18, which is rotatably supported on the control housing by the bearing 63, and which is provided with the actuating hand wheel 17.

It is obvious from the construction that a rotation of the hand wheel 17 results in the axial adjustment of the rod 218 and of the pulley sections 217 and 15, and in the resultant adjustment of the effective diameter of the adjustable pulley structures.

As in the construction of Figure 4, lubricant may be injected to the bearings and pulley structures by means of the pressure lubricating fixture 91 and the lubricating apertures formed in the motor shaft.

The adjusting movement of the axially adjustable member 226 may be limited by means of the threaded rod 229, the end of which abuts against the member 226 when the effective pulley diameter has been adjusted to its maximum diameter. The threaded rod 229 threadedly engages the control housing 227, and may be locked in the adjusted position by means of the lock nut 230.

Figures 6 and 7 illustrate a form of the multiple belt adjustable speed drive in which means are provided for adjusting both of the pulley sections of each of the adjustable pulley structures with respect to the supporting shaft. Referring to Figure 6; the electric motor 94 is supported on the sliding motor base 95, which in turn is slidably supported on the sub-base 96. The motor shaft has mounted thereon the adjustable diameter multiple belt pulley 97, which is in driving relation to the belts 3 and 4. The adjustable diameter multiple belt pulley 97 is formed by the adjustable pulley structures 100 and 101, the adjustable diameter pulley structure 100 being in driving relation to the belt 3 and the adjustable pulley structure 101 being in driving relation to the belt 4. The pulley structures 100 and 101 are respectively formed by the pulley sections 102 and 103 and the pulley sections 104 and 105, the pulley sections 102 and 104 being faced toward the left as viewed in Figure 6 and the pulley sections 103 and 105 being faced toward the right. The opposite facing pulley sections forming each of the adjustable pulley structures are positively adjusted in opposite axial directions and by equal increments by means of the hand wheel 106, which is rotatably supported concentric with the motor shaft. The means whereby this adjustment of the pulley sections is produced by the rotation of the handwheel will be described in detail in connection with Figure 7.

The sub-base 96 may be provided with removable cover plates 108 and 109, which are equivalent to the cover plates 26 and 27 of the sub-base 20 of Figure 2. Means similar to that of Figure 2 may be employed for adjusting the position of the sliding base 95 and of the supported motor and pulley structure. However, due to the fact that both of the pulley sections of each of the pulley structures are adjusted with respect to the supporting shaft; it is not necessary to move the motor in an axial direction simultaneously with the adjustment of the center distance. Thus the sub-base 96 is provided with the guide 110, which does not produce any axial movement of the supported motor and pulley structure. The structure associated with the rod 29 and the helical spring 34 of Figure 2 may also be employed in the construction of Figure 6 to adjust the center distance between the driving and driven pulleys in accordance with the adjustment of the effective pulley diameters. Thus the removable cover plate 109 is provided with the bushing 111 which supports the rod 29 and the sliding base 95 has removably secured thereto the pedestal 28 which is constantly urged in a center distance increasing direction by the helical spring 34.

The driving motor and adjustable pulley structure of Figure 6 are illustrated in detail by Figure 7. Referring to Figure 7; the electric motor 94 is provided with stator 37, rotor 38 and the end bracket 42 which may in every way be equivalent to the corresponding members in Figure 4. The rotor 38 is rotatably supported by tubular motor shaft 112, which in turn is supported on the end brackets 42 and 113 by the bearings 40 and 41. Except for the differences which will be noted, the end bracket 113 may be equivalent to the end bracket 43 of Figure 4. The end bracket 113 has formed thereon the flanged surface 114 to which is secured by means of the bolts 115 the control housing 116.

The control housing 116 has removably secured thereto the bearing supporting plate 117, which together with the bearing cap 118 forms the bearing housing for the bearing 119, which rotatably supports the lead screw 107 and the hand-wheel 106. Control housing 116 has slidably supported therein the axially adjustable bearing housing 120, which in turn provides a support for the axially adjustable bearing housing 121. The bearing housings 120 and 121 have respectively secured therein the bearings 122 and 123. Bearing 122 is supported on the collar 124 and is held against axial movement by the lock washer 125, the collar 124 and lock washer 125 being in turn secured to the tubular rod 126 by the lock nut 127. Thus, an axial movement of the bearing housing 120 results in a corresponding axial movement to the tubular rod 126.

The bearing 123 is similarly axially fixed with respect to the rod 128 by the collar 129, the lock washer 130 and the lock nut 131. Thus the axial adjustment of the bearing housing 121, likewise, results in a corresponding axial adjustment of the rod 128.

Bearing housings 120 and 121 are prevented from rotation by the keys 132 and 133, and are axially adjusted in opposite directions by means of the lead screw 107. For this purpose the lead screw 107 is provided with the right hand thread 134, which engages the removable cap 136 of the bearing housing 120 ond the left handed thread 135 which engages the bearing housing 121. Thus a rotation of the lead screw 107 results in an equal and opposite axial movement of the tubular rod 126 and of the rod 128.

The rod 128 and the tubular rod 126 project through the aperture 137, of the tubular motor shaft, to the opposite end of the shaft. The tubular rod 126 is provided with the threaded end 138, to which the collar 141 is secured by means of the lock nut 139. The pulley sections 102 and 104 are secured to the collar 141 by means of a threaded rod and sleeve construction similar to that of Figure 4. In the present instance a plurality of threaded rods 145 are provided which pass through the ears 142 formed on the collar 141, and which are threaded into the pulley section 102, the sleeves 146 being provided for fixing the relative position of the pulley sections 102 and 104, and the pulley section 104 being fixed with respect to the collar 141 by the sleeves 147. Thus by means of the construction provided an axial movement of the tubular rod 126 results in a corresponding axial movement of the pulley sections 102 and 104.

The rod 128 is provided with the threaded end 148, to which is removably secured the cup 149 by means of the lock nuts 151. The cup 149 is secured to the pulley section 105 by means of the bolts 152. The pulley section 105 is in turn secured to the pulley section 103 by means of a plurality of threaded rods 153 and sleeves 154, which may in every way be equivalent to the rods 72 and sleeves 73 of Figure 4. The pulley sections may be suitably keyed to the motor shaft by means of the key 155 and may be provided with bearing bushings of lubricant retaining material similar to the bushings 86 and 87 of Figure 4. It is obvious from the construction that the pair of pulley sections forming each of the adjustable pulley structures may be positively adjusted in either direction by a rotation of the handwheel 106 and the associated lead screw 107.

As in the construction of Figure 4, the aperture 137 formed in the motor shaft provides means for injecting lubricant to the supporting surfaces of the pulley sections. Thus the motor shaft may be provided with the lubricant conducting passages 156, 157, 158, 159, and 160 for respectively conducting lubricant to the supporting surfaces of the pulley sections 105, 104, 103, 102 and the bearing 40. The lubricant may be injected into the control housing 116 through the lubricating passage 161, which may be suitably threaded to engage the pressure lubricating fixture 162.

Figures 8 and 9 illustrate the driving motor structure of another form of adjustable speed drive. In this form the driving motor and pulley structures are pivotally supported and means are provided for moving the pivotally mounted motor structure in an axial direction simultaneously with its pivotal movement.

The pivotal mounting provided for adjusting the center distance between the driving and driven pulleys is best illustrated by Figure 8, which is an end elevation of the driving motor taken from the pulley end of the motor shaft. Referring to Figure 8: the driving electric motor 163 is pivotally supported on the pivoting base 164, which in turn is pivotally supported by the shaft 199 on the supporting base 165. The motor 163 is in driving relation to the multiple belt adjustable diameter pulley 173, which in turn is in driving relation to the belts 3 and 4. As in the construction of Figure 1, the belts 3 and 4 may be in driving relation to the multiple belt pulley 5, mounted on the load driving shaft 6.

The shaft 199, forming the pivot, is so positioned with respect to the supported motor, that the weight of the motor constantly urges the driving pulley in a center distance increasing direction. The force urging the driving pulley in a center distance increasing direction may be increased by operating the driving motor in such a direction that the reactive torque, produced on the motor frame by the load, urges the pivotal mounting in a center distance increasing direction.

The helical tension spring 214 is provided for further urging the pivotal support in a center distance increasing direction. The helical spring provides means for obtaining the required belt tension for all positions of the multiple belt adjustable pulley. For it is obvious from the construction that as the effective diameter of the driving pulley is increased, that the lever arm of the weight supported on the pivoting base about the pivot formed by the shaft 199 is decreased. Thus the tension of the driving belts will be reduced unless additional means are provided for increasing the belt tension. In the present construction the spring 214 exerts its maximum force when the driving pulley has a maximum effective diameter, thus the driving belts are maintained at a substantially constant tension for all values of the effective pulley diameter.

The driving motor and pulley structure of Figure 8 are illustrated in detail by Figure 9; which is a side elevation taken from the right hand side of Figure 8. Referring to Figure 9; the driving motor 163 may be provided with the stator 166, the end brackets 168 and 169 and the rotor 167, which are of standard motor construction. The rotor 167 is rotatably supported on the end brackets 168 and 169 by means of the motor shaft 170 and the bearings 171 and 172. The motor shaft 170 has supported thereon the driving pulley 173, which is formed by the pulley sections 174 and 175, axially fixed to the motor shaft, and the pulley sections 176 and 177, which are axially adjustable with respect to the fixed pulley sections.

The pulley sections 174 and 175 may be respectively secured to the motor shaft by the set screws 178 and 179. The pulley sections 176 and 177 may be axially fixed with respect to each other by means of a threaded rod and sleeve construction similar to that of Figure 4. For this purpose a plurality of threaded rods 180 may be provided which are threaded into the pulley section 176 and which by means of the sleeves 181 hold the pulley section 177 at a fixed axial distance from the pulley section 176.

To provide means for adjusting the axial position of the pulley sections, pulley section 176 is provided with the hub 182 to which is secured the bearing 183. The inner race of the bearing 183 is axially fixed to the pulley hub and the outer race is held within the axially adjustable bearing housing 184. The bearing housing 184 has secured thereto the oppositely placed radially projecting pins 185, which engage the slots 186, formed in the shift lever 187. The shift lever 187 encircles the bearing housing 184 and thus provides means whereby the bearing housing and the bearing 183 may be urged in an axial direction without tilting the bearing housing. In the illustration of Figure 9 a part of the shift arm is broken off to show the interior of the bearing housing. The shift arm 187 is pivotally supported on the pedestal 188, which in turn is supported by the pivoting base 164. It is obvious from the construction that a pivotal movement of the shift arm, about the pivot formed by the pedestal 188, results in a corresponding axial adjustment of the pulley sections 176 and 177.

To provide means for adjusting the angular position of the shift arm the motor frame has supported thereon the bearing pedestals 189 and 190. The bearing pedestals provide means for rotatably supporting the threaded rod 191 which engages the threaded sleeve 192. The threaded sleeve 192 has formed thereon the clevis 193, which supports the pin 194. The pin 194 engages the slotted end 195 of the shift lever 187, the engagement of the clevis 193 and the pin 194 with the shift arm preventing the rotation of the threaded sleeve 192. The threaded rod 191 is rotatably supported on the bearing pedestal 190 by means of the bearing 196 which is suitably secured to the threaded rod 191 and has its outer race held in the bearing housing 197, formed in the bearing supported pedestal 190. It is obvious from the construction that the bearing 196 effectively locks the rod 191 against axial movement. Thus a rotation of the rod results in a corresponding axial movement of the threaded sleeve 192 and of the pin 194, and in the resulant pivotal movement of the shift arm 187. Suitable means may be provided for actuating the rotation of the rod 191. In the present instance the handwheel 198 is provided, which is suitably secured to the rod. Thus the effective diameter of the adjustable pulley structures formed by the pulley sections 174 and 176, and the pulley sections 175 and 177, may be adjusted by the rotation of the handwheel 198. The engagement of the threaded sleeve 192 with the rod 191 effectively locks the shift arm and the pulley sections in the adjusted position, as the angle of lead of the thread formed in the sleeve 192 may be made sufficiently small to prevent any axial force exerted on the sleeve from producing a rotation of the rod.

The pulley sections 174 and 175 are fixed to the motor shaft. Thus when the effective diameter of the driving pulley is increased; the pulley sections fixed to the motor shaft must be moved toward the right, as viewed in Figure 9, simultaneously with the increase in the pulley diameter; if it is desired to maintain the belt in alignment. The required movement of the pulley sections may be accomplished by moving the pivoting base 164 in an axial direction simultaneously with its pivotal movement. In the present instance an inclined slot and pin construction is provided for this purpose. The pivoting base 164 is pivotally supported on the supporting base 165 by means of the shaft 199, which is rotatably supported on the upright arms 200 and 201 of the supporting base and which is secured to the arms 202 and 203 formed on the pivoting base. The shaft 199 may be suitably secured to the arms 202 and 203 by means of the set screws 204 and 205. To produce the axial movement of the pivoting base, the shaft 199 has secured thereto the pin 206, which engages the oppositely positioned slots 207 and 208 formed in the sleeve 209, the sleeve 209 being suitably secured to the supporting base 165. It is obvious from the construction that a pivotal movement of the pivoting base 164 results in a corresponding rotational movement of the shaft 199, and that a rotational movement of the shaft 199 results in the required axial movement of the shaft 199, the pivoting base 164 and of the pulley sections 174 and 175 secured to the motor shaft. The inclined slots 207 and 208 may be formed with a variable lead angle, so that the pulley sections, secured to the motor shaft, are adjusted precisely the required axial distance to maintain the belt in perfect alignment. However, an average angle may be employed for the inclined slots so that the belt is maintained in substantial alignment for all positions of the driving pulley.

In order to limit the pivoting movement of the motor supported by pivoting base 164, the shaft 199 may have secured thereto the collars 210 and 211, placed at either side of the sleeve 209. The movement of the pivoting base in one direction is limited by engagement of the collar 210 with one end of the sleeve 209 and in the opposite direction by the engagement of the collar 211 with the other end of the sleeve 209. The collars may be secured in the required positions on the shaft 199 to provide the pivotal movement required by the adjustable pulley structures.

To limit the adjustment of the effective diameter of the adjustable pulley structures, the lock nuts 212 and 213 may be secured to the threaded rod 191 on either side of the threaded sleeve 192. The lock nuts may be so positioned on the threaded rod, that when the diameter of the driving pulley has been adjusted to its limiting maximum diameter the lock nuts 213 come into contact with the end of the threaded sleeve 192, thereby preventing any further increasing adjustment of the pulley diameter, and the lock nuts 212 are so positioned on the rod that when the effective diameter of the adjustable pulley has been adjusted to its limiting minimum diameter the end of the sleeve 192 comes into contact with the lock nuts 212, thereby preventing a further decrease in the effective diameter of the pulley.

In the illustration of Figure 9 a portion of the helical spring 214 has been broken away, in order to show the inclined slot and pin construction for shifting the axial position of the pivoting base 164.

I claim:

1. In an adjustable speed drive, an electric motor having a frame and a tubular shaft projecting from the frame, an adjustable pulley structure mounted on said motor shaft and driven thereby, said adjustable pulley structure having a pair of pulley sections with opposed inclined belt engaging faces, forming by relative axial adjustment variable effective pulley diameters, a pair of members respectively connected to said pair of pulley sections, means projecting through said tubular motor shaft to the side of said motor frame remote from the pulley structure, and means for causing said last mentioned means to adjust the axial positions of said members by substantially equal and opposite amounts with respect to said tubular shaft.

2. In an adjustable speed drive, a shaft, an adjustable pulley structure mounted on said shaft, said adjustable pulley structure having a pair of pulley sections with opposed inclined belt engaging faces, forming by relative axial adjustment variable effective pulley diameters, a pair of bearing members, means whereby each of said bearing members is respectively axially fixed with respect to one of said pulley sections, means forming a pair of bearing housings for respectively engaging said pair of bearings, and means for adjusting the axial positions of said bearing housings by substantially equal and opposite amounts, one of said bearing housings providing means for guiding the axial movement of the other of said bearing housings.

3. In an adjustable speed drive, an electric motor having a tubular shaft, a driving pulley mounted on said shaft adjacent one end thereof and in driving relation with the shaft, said driving pulley including a pair of cooperating pulley sections with opposed inclined belt engaging faces, forming by relative axial adjustment variable effective pulley diameters, and means for simultaneously altering the axial positions of the pulley sections by substantially equal and opposite amounts with respect to the center line of the pulley, said means including a tubular adjusting member slidable within the motor shaft and extending beyond the end thereof, a collar secured to one end of said member, means securing one of the pulley sections to said collar, an adjusting rod slidable within the tubular adjusting member and extending beyond the end thereof, a cup secured to said rod and telescoping over said collar, means securing the other of said pulley sections to the cup, and means disposed at the opposite end of said shaft for axially moving said adjusting members by equal and opposite amounts.

4. In an adjustable speed drive, an electric motor having a tubular shaft, a driving pulley mounted on said shaft adjacent one end thereof and in driving relation with the shaft, said driving pulley including a pair of cooperating pulley sections with opposed inclined belt engaging faces, forming by relative axial adjustment variable effective pulley diameters, and means for simultaneously altering the axial positions of the pulley sections by substantially equal and opposite amounts with respect to the center line of the pulley, said means including a tubular adjusting member slidable within the motor shaft and extending beyond the end thereof, a collar secured to one end of said member, means securing one of the pulley sections to said collar, an adjusting rod slidable within the tubular adjusting member and extending beyond the end thereof, a cup secured to said rod and telescoping over said collar, means securing the other of said pulley sections to the cup, bearing means secured to the opposite end of said adjusting member, an outer cage for supporting said bearing, means to guide said outer cage for movement axially with respect to the shaft, bearing means secured to the opposite end of said adjusting rod, a cage for supporting said last mentioned bearing and slidably supported within said outer cage, and a screw having threads of opposite leads respectively engaging each of said cages, whereby said cages may be moved axially by substantially equal and opposite amounts.

DON HEYER.